Nov. 9, 1937.   A. Y. DODGE   2,098,379
LUBRICATING DEVICE AND METHOD OF MANUFACTURE
Filed April 5, 1935
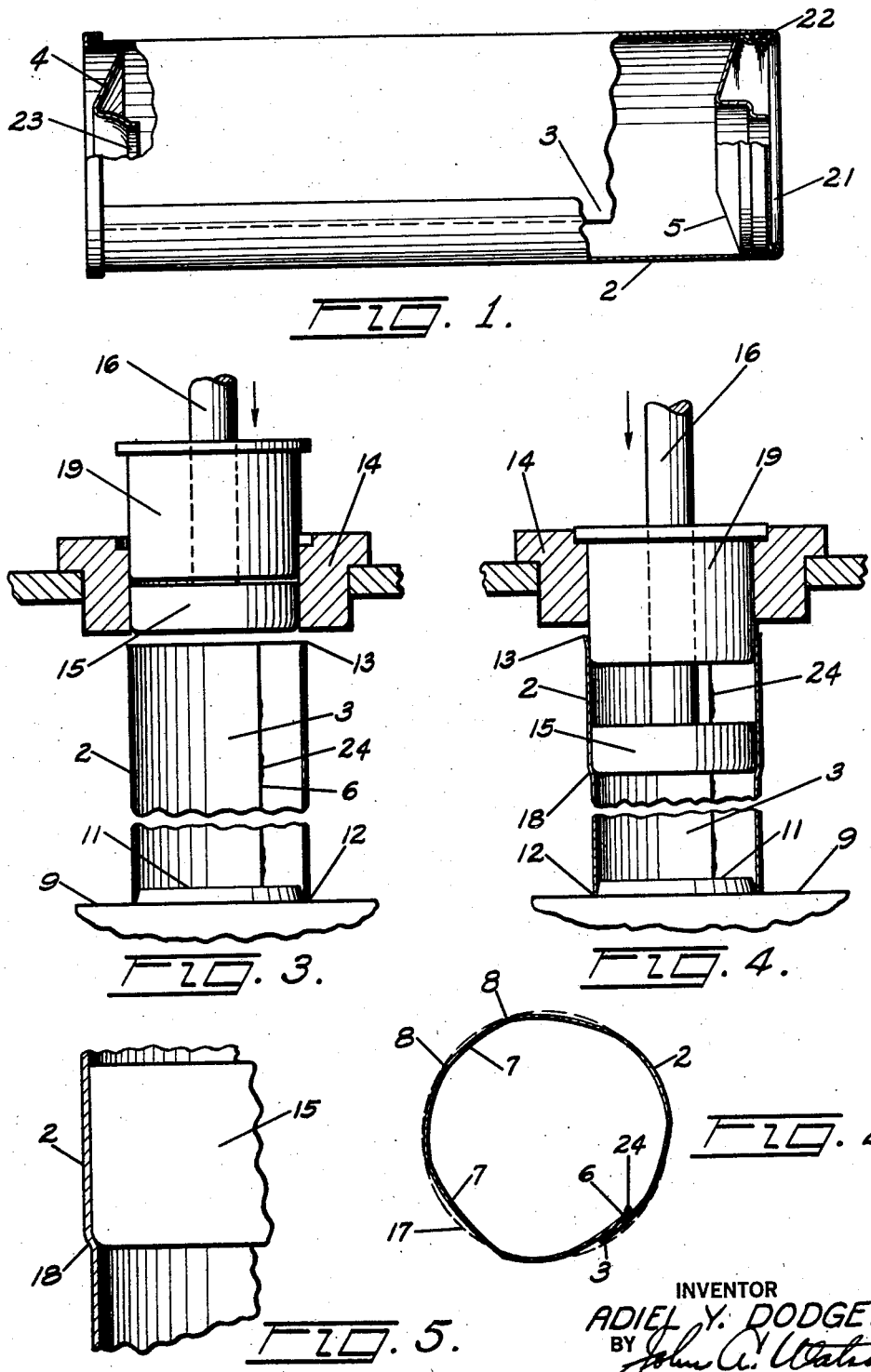
INVENTOR
ADIEL Y. DODGE.
BY
ATTORNEY Patented Nov. 9, 1937

2,098,379

UNITED STATES PATENT OFFICE 2,098,379

LUBRICATING DEVICE AND METHOD OF MANUFACTURE

Adiel Y. Dodge, South Bend, Ind., assignor to The Lubrication Corporation, Chicago, Ill., a corporation of Delaware Application April 5, 1935, Serial No. 14,792

8 Claims. (Cl. 113—120)

This invention relates to improvements in lubricating devices and more particularly to lubricant containing cartridges having a piston forming one end closure thereof against which thrust may be applied to discharge the cartridge contents. The invention contemplates an improved method of forming the cartridge to assure uniformity in size and shape of the cartridge side wall.

Lubricant-containing cartridges of the type contemplated by my invention are intended for use primarily as an interchangeable source of lubricant supply for lubricating guns or dispensers and to be discarded when the contents thereof are exhausted. Obviously it is desirable, in such a cartridge, to reduce the material and construction cost to a minimum so that a maximum quantity of lubricant may be placed in the cartridge for a given purchase price.

Cartridges constructed of relatively thin sheet metal are admirably suited for this purpose. I have found, however, that the construction of sheet metal cartridges having cylindrical bodies within which a piston forming a closure for the cartridge is adapted to slide, presents, particularly in quantity production, a serious problem in the maintenance of uniform diameter in body cross-section. This difficulty may be due, in part, to the stiffness or hardness of the relatively thin metal sheet of which the cylindrical side wall of the cartridge is formed and is particularly evident after initial formation of the cylindrical body by the presence of noticeable flat areas running longitudinally of the cartridge body separated by areas of relatively acute curvature. Such irregularities in body contour render it impossible to provide uniform contact between the piston packing and the inner body wall and as a result leakage past the piston may occur as the piston is moved longitudinally against the lubricant contents during use or even during storage or shipment whether or not the piston is moved or put under pressure.

I have also found that during the production of sheet metal cartridges of the type described, the solder oftentimes flows in such a manner as to form beads or lumps along or adjacent to the soldered seam upon the inner surface of the body wall, or burrs and like projections may form during the soldering operation and if present, will not only impede the free advance of the piston along the axis of the cartridge, but may cause leakage of lubricant whether or not the cartridge contents be placed under pressure.

It is therefore an object of my invention to provide an improved fabricated sheet metal lubricant cartridge of cylindrical shape having smooth inner side walls of uniform curvature thereby uniformly to engage and to make a tight seal with a piston forming one end closure for the cartridge, and wherein free movement of the piston along the longitudinal axis of the cartridge at all times is assured.

Another object is to provide an improved method of fabricating lubricant cartridges, of the character described, to eliminate any reasonable possibility of leakage of lubricant past the cartridge piston.

A further object is to provide an improved method of lubricant cartridge construction including the planishing of the inner cylindrical cartridge side wall prior to the final assembly of the cartridge thereby to attain uniformity in cross-sectional size and shape of the cartridge body.

Other objects, the advantages and uses of the invention will be apparent after reading the following specification and claims, and after consideration of the drawing forming a part of this specification wherein:

Fig. 1 is a side elevation, partially in section, of an interchangeable sheet metal lubricant cartridge of the type contemplated by my invention;

Fig. 2 is a cross-sectional view of the cylindrical cartridge body as it may appear during the course of construction and prior to treatment according to my invention;

Fig. 3 is a sectional view of an apparatus for planishing and stretching the cartridge body, illustrating the manner in which the cartridge body may be placed thereon;

Fig. 4 is a view similar to Fig. 3 illustrating the parts as they appear during the planishing and stretching operation; and Fig. 5 is an enlarged fragmentary view of a part of the assembly shown in Fig. 4.

With reference to Fig. 1 of the drawing the cartridge illustrated therein is typical of one type of interchangeable lubricant supply cartridge intended for use as a source of lubricant supply for hand lubricating guns or dispensers. The cartridge may comprise a cylindrical sheet metal body 2 formed by overlapping and soldering the opposite edge portions of a rectangular sheet of metal as indicated at 3, a sheet metal head 4 closing one end of the body 2, and a sheet metal piston 5 slidably mounted within the cartridge body forming a closure for the opposite end thereof. I have described the piston 5 as formed of sheet metal since I have found such construction to possess the desired rigidity and uniformity in production, yet it is obvious that the piston may be constructed of other material, as desired, and in like manner the head 4 may be formed of a material other than sheet metal although I prefer to employ the latter.

In Fig. 2 I have shown, in cross-section, the body 2 of the cartridge as it may appear subsequent to the rolling of the metal sheet into the form of a cylinder and the joining of the overlapping and opposed edge portions thereof by soldering as indicated at 6. It should be noted here that while a lap seam has been pictured, a lock seam might have served just as well for illustrative purposes.

In order to demonstrate more fully the significance of my improved forming method, I have exaggerated the irregular contour of the cross-section of the body in Fig. 2 to indicate at 7 the portions of the side wall which instead of being cylindrical, are somewhat flat and at best may be said to be formed with a radius many times greater than the mean radius of the cylindrical body. Intermediate the portions 7 may be seen relatively acute curved portions, indicated at 8, the radii of which are considerably less than the mean radius of the cartridge body. This malformation of the circular body occurs as a natural consequence of the wrapping of the sheet of metal from which the body is formed about a horn or like appliance and is probably attributable to the hardness of the metal. Although the variations in contour are exaggerated in the drawing, such variations are readily ascertainable by the naked eye of an observer in the actual commercial production of sheet metal cartridges of the type described. I have overcome the effect of such harmful malformation of the cylindrical cartridge wall by a simple and highly effective procedure and for this purpose I employ an apparatus of the type illustrated in Figs. 3 and 4.

The apparatus may include a stationary stage 9 having a circular positioning boss 11 fixed thereto for locating the lower end 12 of the cylindrical cartridge body 2 which may rest directly upon the stage 9. An annular and stationary guide member 14 is located above and in axial alignment with the boss 11, the distance between the parts being sufficient to permit the cartridge body 2 to be placed therebetween, as indicated in Fig. 3. A hardened steel planishing head 15, circular in form and mounted upon the lower end of a plunger 16, is mounted for reciprocation through the medium of the plunger from a point within the annular member 14 downwardly to the boss 11 and back during one cycle of operation thereof. I prefer to employ a planishing head having an external diameter that is approximately two-thousandths of an inch in diameter larger than the mean diameter of the cartridge body 2, as initially formed and as represented by the dotted line 17 in Fig. 2. This arrangement results in the actual stretching of the body and enlargement of the internal diameter thereof to cause the metal of the body to flow, as indicated at 18 in Fig. 5, to produce a body wall cross-section that is of uniform diameter and which is smooth upon the inner surface thereof.

In order to facilitate the admission of the planishing head into the cylindrical cartridge body, I prefer slightly to flare the upper end of the cylindrical body as indicated at 13. This flaring may be performed during or after the preliminary forming operation on the cartridge body. The upper end of the cartridge body may be held in proper position relative to the planishing head 15, during the planishing and stretching operation, by a collar 19 mounted for movement upon the plunger 16. After the planishing head 15 has entered the upper and flared end of the cartridge body, the collar 19 may move into the position shown in Fig. 4. The cartridge body is thus held rigidly in place during the major portion of the planishing and stretching operation.

Subsequent to the body forming operation, as described, the head 4 may be placed upon one end of the cylindrical body of the cartridge, the piston 5 inserted in the opposite end thereof, and the adjacent end of the cartridge body may be rolled to provide a bead 21 thus to retain the piston within the cartridge and to reinforce the free edge of the body side wall.

Sheet metal lubricant cartridges constructed and finished in the manner herein described possess a high degree of uniformity in size and shape of cylindrical body and it is therefore a simple matter to maintain the proper fit between the piston packing, indicated at 22 upon the skirt of the piston 5, and the inner wall of the cartridge body so that leakage between piston packing and cartridge wall is minimized and to assure smooth piston movements in response to thrust applied to the bottom of the piston tending to move the same in the direction of the discharge opening 23 in the head 4 as when the contents of the cartridge are being discharged. Another advantage attained by my improved method of cartridge construction is that small beads of solder, such as represented in a somewhat exaggerated manner at 24, present on the inner wall surface of the cartridge body as a result of the soldering of the overlapping edges of the sheet metal stock, are either removed by the movement of the planishing head 15 through the body or they are reduced to a negligible thickness and completely smoothed out by cold flow of the solder. Furthermore, any slight burrs or projections which might be present on the inner wall surface are also removed during the planishing operation. Inasmuch as the stock selected for any particular run of cartridges is of a substantially uniform thickness and ductility, the stretching of all of the cartridges during the planishing operation will be substantially uniform and all will, when finished, have the same internal diameter within close limits, so that pistons and packings of uniform size will fit and perform in the same manner within all of the cartridge bodies.

During the planishing operation the seam 6 will be shaped in the same manner as the remainder of the cylindrical body, leaving no parts projecting inside of the general circle of the body interior and with only a very slight groove adjacent the inner lapped edge. Surplus of solder used in soldering the seam and resulting in beads on the inside wall of the body along the seam edge are either removed or caused to flow along the groove formed between the end of the sheet and the overlapping wall by the planishing tool. This will cause such solder to fill the groove to the extent that solder is present for the purpose and will leave a relatively smooth inner surface. However, I have found that a properly packed piston will leave no appreciable leakage even where the groove is not filled.

It is to be understood that the above described embodiments of the invention are for the purpose of illustration only and various changes may be made therein without departing from the spirit and scope of the invention.

I claim:

1. The method of forming a sheet metal cylinder which comprises, rolling a relatively thin rectangular metal sheet into the form of a cylinder, joining the adjacent edge portions of said sheet in a seam, and forcing a planishing tool axially through said cylinder to smooth out the irregularities in the inner side wall of the cylinder and to assure uniform inside diameter thereof and to reduce to a negligible amount the irregularity resulting from the seam.

2. The method of forming a sheet metal cylinder which comprises, rolling a relatively thin rectangular metal sheet into the form of a cylinder, joining the adjacent edge portions of said sheet in a beam, and forcing a planishing tool axially through said cylinder to stretch the cylinder beyond the elastic limit of the metal and to smooth out irregularities in the inner side wall of the cylinder and to assure uniform inside diameter thereof and to reduce to a negligible amount the irregularity resulting from the seam.

3. The method of forming a sheet metal lubricant cartridge which comprises, rolling a rectangular relatively thin metal sheet into the form of a cylinder, joining the adjacent edge portions of said sheet in a seam, forcing a planishing tool through said cylinder to smooth out the inner side wall of the cylinder and to assure uniform inside diameter thereof and to reduce to a negligible amount the irregularity resulting from the seam, fixing a head upon one end of the cylinder to form a closure therefor, and inserting a piston through the opposed end of the cylinder to provide a movable closure for the cylinder.

4. The method of forming a sheet metal lubricant cartridge which comprises, rolling a rectangular relatively thin metal sheet into the form of a cylinder, joining the adjacent edge portions of said sheet in a seam, forcing a planishing tool through said cylinder to stretch the cylinder circumferentially beyond the elastic limit of the sheet metal and to smooth out the inner side wall of the cylinder and to assure uniform inside diameter thereof and to reduce to a negligible amount the irregularity resulting from the seam, fixing a head upon one end of the cylinder to form a closure therefor, and inserting a piston through the opposed end of the cylinder to provide a movable closure for the cylinder.

5. The method of forming a sheet metal cylinder which comprises, rolling a rectangular relatively thin metal sheet into the form of a cylinder, joining the adjacent edge portions of said sheet in a seam, flaring one end of said cylinder outwardly to receive a planishing tool, and forcing the planishing tool axially through said cylinder to smooth out the inner side wall of the cylinder and to assure uniform inside diameter thereof and to reduce to a negligible amount the irregularity resulting from the seam.

6. The method of forming a sheet metal cylinder which comprises, rolling a rectangular relatively thin metal sheet into the form of a cylinder, joining the adjacent edge portions of said sheet by soldering, and forcing a planishing tool axially through said cylinder to smooth out the inner side wall of the cylinder, to assure uniform inside diameter thereof, and to remove excess solder on the inner wall surface of the cylinder.

7. An interchangeable lubricant cartridge comprising, a relatively thin sheet metal cylinder of uniform internal diameter having a longitudinal seam, the metal walls of said cylinder having been stretched circumferentially throughout their thickness beyond their elastic limit to provide a smooth inner surface of uniform diameter and to reduce to a negligible amount the irregularity resulting from the seam, an end closure permanently secured to one end of said cylinder, and a circular piston slidably mounted in said cylinder and engaging the wall thereof substantially throughout its circumference.

8. The method of forming a cartridge for lubricant or the like which comprises forming a generally cylindrical body of relatively thin sheet metal, forcing axially through said body a circular planishing tool of larger diameter than the mean diameter of the body to stretch the metal of the body wall circumferentially beyond its elastic limit and to smooth out the inner side wall of the body and to assure uniform inside diameter thereof, fixing a head upon one end of the body, and inserting in the other end of the body a circular piston of substantially the same diameter as the planishing tool.

ADIEL Y. DODGE.